(12) United States Patent
Kondoh et al.

(10) Patent No.: US 10,564,916 B2
(45) Date of Patent: Feb. 18, 2020

(54) LIQUID CRYSTAL DISPLAY DEVICE AND ELECTRONIC DEVICE

(71) Applicant: SHARP KABUSHIKI KAISHA, Sakai, Osaka (JP)

(72) Inventors: Kazuya Kondoh, Sakai (JP); Yasuki Mori, Sakai (JP); Masaki Uehata, Sakai (JP); Kohji Saitoh, Sakai (JP); Kazuhisa Yoshimoto, Sakai (JP); Kosuke Kawamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/157,088

(22) Filed: Oct. 10, 2018

(65) Prior Publication Data

US 2019/0108805 A1 Apr. 11, 2019

(30) Foreign Application Priority Data

Oct. 11, 2017 (JP) .................. 2017-197581

(51) Int. Cl.
*G06F 3/14* (2006.01)
*G02F 1/1333* (2006.01)
*G09G 3/36* (2006.01)
*G06F 1/16* (2006.01)

(52) U.S. Cl.
CPC ........ *G06F 3/1446* (2013.01); *G02F 1/13336* (2013.01); *G09G 3/3696* (2013.01); *G06F 1/1616* (2013.01); *G09G 2300/026* (2013.01); *G09G 2310/0232* (2013.01); *G09G 2320/0233* (2013.01); *G09G 2320/0626* (2013.01)

(58) Field of Classification Search
CPC ............... G09G 3/3696; G09G 3/3648; G09G 2310/0232; G09G 2320/0233; G09G 2320/0626; G06F 3/1446; G06F 1/1616; G06F 1/1637; G06F 1/1654; G06F 1/13306; G02F 1/13336; G02F 1/13306
See application file for complete search history.

(56) References Cited

U.S. PATENT DOCUMENTS

| 2011/0279487 A1* | 11/2011 | Imamura | G09G 3/3611 345/690 |
| 2014/0043380 A1* | 2/2014 | Ichioka | H04N 5/57 345/690 |
| 2015/0015469 A1* | 1/2015 | Dong | G09G 3/3655 345/88 |
| 2018/0130425 A1* | 5/2018 | Choi | G02F 1/133385 |

FOREIGN PATENT DOCUMENTS

JP 2002-091391 A 3/2002

* cited by examiner

*Primary Examiner* — Liliana Cerullo
(74) *Attorney, Agent, or Firm* — ScienBiziP, P.C.

(57) ABSTRACT

A liquid crystal display device includes a liquid crystal panel and a control unit. The control unit stores a plurality of setting values of a voltage applied to a counter electrode. The setting value is a value of the applied voltage at which variation in luminance appears at a portion located apart from a reference portion that is a region in the liquid crystal panel.

7 Claims, 8 Drawing Sheets

LIQUID CRYSTAL DISPLAY DEVICE AND ELECTRONIC DEVICE

BACKGROUND

1. Field

The present disclosure relates to a liquid crystal display device and an electronic device including the liquid crystal display device.

2. Description of the Related Art

An electronic device, such as a personal computer or the like, includes a liquid crystal display device. As the liquid crystal display device, for example, an active matrix liquid crystal display device in which scanning signal lines, image signal lines, and switching elements (for example, thin-film transistors (TFTs)) are arranged in a matrix has been known. Such liquid crystal display devices are desired to have a large display screen, for example, in view of improving workability in the above-described electronic device.

As the size of the display screen increases, a display characteristic of an image varies in some cases in the display screen in the liquid crystal display device. This problem occurs because a pixel potential center varies at an input port and a terminal of a scanning signal due to distortion of a signal waveform and symmetry of a pixel potential to a potential of a counter electrode is deteriorated. As a countermeasure for the above-described problem, it is known that the liquid crystal display device is configured such that a voltage corresponding to a scanning signal between the input port and the terminal, that is, for example, a voltage applied to an opposing substrate or a center of an image signal voltage has an inclination (for example, see Japanese Unexamined Patent Application Publication No. 2002-091391).

As another countermeasure for the above-described problem, it is considered to optimize a voltage applied to the counter electrode, based on image display at a center portion of the display screen as a reference, such that, as compared to a center portion of a liquid crystal panel, a display characteristic of the image at an end portion thereof is relatively low. In this case, an image may be displayed sufficiently well at the center portion of the liquid crystal panel and, at the end portion of the liquid crystal panel, a display defect, such as variation in luminance due to the display characteristic being low as compared to the center portion, may occur. However, in general, such display defect is not included in a major portion of an image that is displayed. Therefore, it is also possible to substantially restrain reduction in the display characteristic by using the above-described another countermeasure.

Increase in size of the display screen in the above-described electronic device may be realized by forming the display screen of the electronic device by using a plurality of liquid crystal panels, that is, two or four liquid crystal panels, for example. In this case, the above-described display screen may be formed as a plurality of screens formed by some of the plurality of liquid crystal panels, that is, for example, a single liquid crystal panel or a set of two or more liquid crystal panels, and also, the display screen may be formed as one screen formed by all of the liquid crystal panels.

When the image is displayed across a plurality of liquid crystal panels, a center portion or the like of the image to be displayed, which is a major portion of the image, may be located at an end portion of a liquid crystal panel. Therefore, when the above-described countermeasure is used, the above-described display defect may occur in a major portion of the image.

An aspect of the present disclosure is to provide a technique that is able to substantially restrain a display defect due to a potential difference even when a display screen is formed by using a plurality of liquid crystal panels.

SUMMARY

A liquid crystal display device according to a first aspect of the present disclosure includes a liquid crystal panel that includes a pixel electrode and a counter electrode, a storage unit that stores a plurality of setting values of a voltage applied to the counter electrode, and a drive unit that applies a voltage of the setting value selected from the plurality of setting values to the counter electrode. The setting value is a value of the applied voltage at which variation in luminance in the liquid crystal panel due to application of the voltage to the counter electrode, when a region of the liquid crystal panel is a reference, appears at an end portion or a side portion located apart from the region in the liquid crystal panel.

An electronic device according to a second aspect of the present disclosure may include the above-described liquid crystal display device and a central processing unit that transmits a signal that is input to the liquid crystal display device.

DESCRIPTION OF THE EMBODIMENTS

Embodiment 1

Figure 1A:
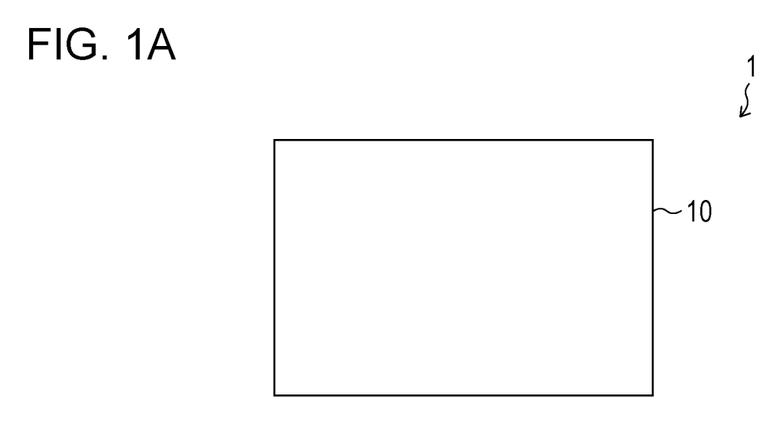
FIG. 1A is a front view schematically illustrating a liquid crystal display device according to Embodiment 1 of the present disclosure.

An embodiment of the present disclosure is described in detail below. FIG. 1A is a front view schematically illustrating a liquid crystal display device according to Embodiment 1 of the present disclosure, FIG. 1B is a side view schematically illustrating the liquid crystal display device, and FIG. 1C is a rear view schematically illustrating the liquid crystal display device.

Figure 1B:
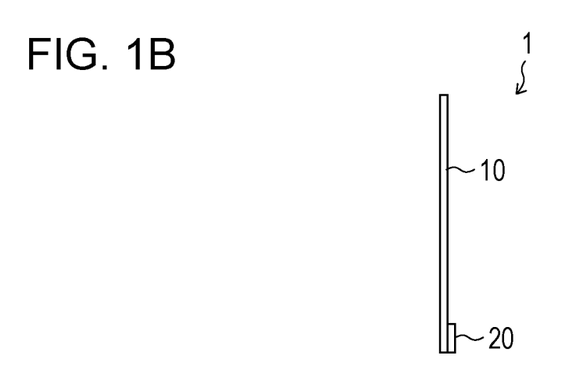
FIG. 1B is a side view schematically illustrating the liquid crystal display device.
Figure 1C:
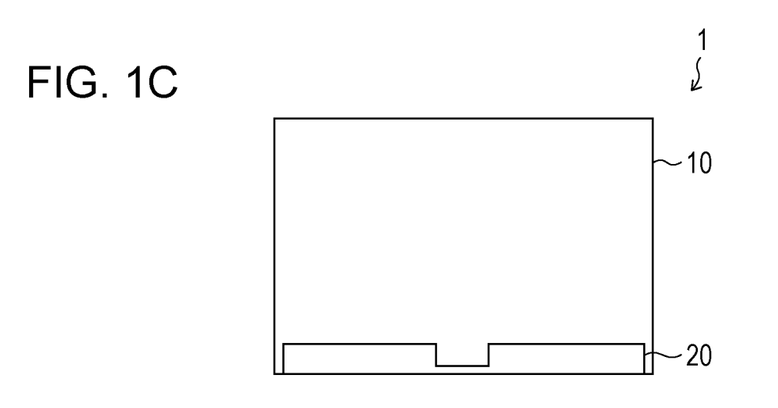
FIG. 1C is a rear view schematically illustrating the liquid crystal display device.

A liquid crystal display device 1 includes a liquid crystal panel 10 and a control unit 20, as illustrated in FIGS. 1A to 1C. The liquid crystal panel 10 includes a pixel electrode and a counter electrode. The counter electrode is, for example, a common electrode that is uniformly arranged so as to oppose the pixel electrode with a liquid crystal layer interposed therebetween. Also, the liquid crystal panel 10 may be a known liquid crystal panel and is, for example, a twisted nematic (TN) liquid crystal panel.

The control unit 20 includes a storage unit, a drive unit, and a calculation unit. These units may be realized by a known technology in the liquid crystal display device. The storage unit is a part that stores a plurality of setting values of a voltage applied to the counter electrode and is formed of, for example, a storage device (a memory) that is normally used in a computer. The calculation unit is a part that selects one of the first to fifth setting values described below, based on an input signal that is described later, and is formed of, for example, a processor that is normally used in a computer. The drive unit is a part that applies a voltage of the setting value that has been selected from the plurality of setting values to the counter electrode and is formed of, for example, a known power supply device that is used in a liquid crystal display device.

The setting value is a value of the applied voltage at which variation in luminance in the liquid crystal panel due to application of the voltage to the counter electrode, when a region in the liquid crystal panel of Embodiment 1 is a reference, appears at an end portion or a side portion located apart from the region in the liquid crystal panel. The region that serves as a reference is hereinafter also referred to as a "reference point". The setting values include, for example, the first to fifth setting values.

Figure 2A:
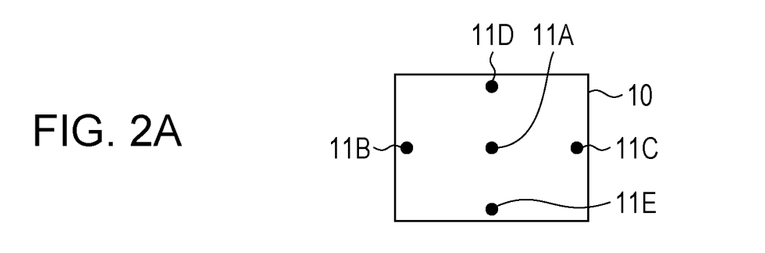
FIG. 2A is a view schematically illustrating positions of first to fifth reference points in Embodiment 1.

FIG. 2A is a view schematically illustrating positions of the first to fifth reference points in Embodiment 1. A first reference point 11A is a center portion of the liquid crystal panel 10. A second reference point 11B is a center portion of one end portion (first end portion) (a left side with respect to a paper surface) of the liquid crystal panel 10. A third reference point 11C is a center portion of the other end portion (second end portion) (a right side with respect to the paper surface) of the liquid crystal panel 10. A fourth reference point 11D is a center portion of one side portion (first side portion) (an upper side with respect to the paper surface) of the liquid crystal panel 10. A fifth reference point 11E is a center portion of the other side portion (second side portion) (a lower side with respect to the paper surface) of the liquid crystal panel 10. Note that, for a liquid crystal panel and a display screen, a left side, a right side, an upper side, and a lower side with respect to the paper surface of each drawing are hereinafter referred to as one end, the other end, one side, and the other side, respectively.

Figure 2B:
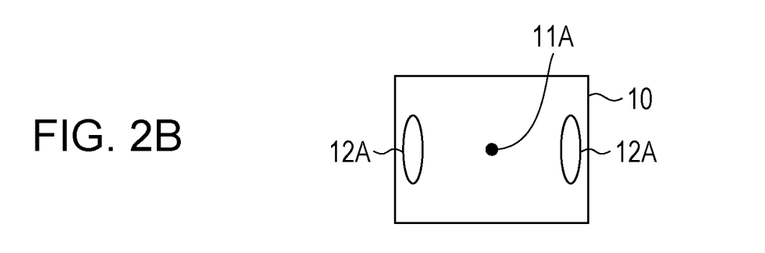
FIG. 2B is a view schematically illustrating a location of occurrence of variation in luminance when a voltage of a first setting value is applied to a counter electrode.

FIG. 2B is a view schematically illustrating a location of occurrence of variation in luminance when a voltage of the first setting value is applied to a counter electrode. The first setting value is a value of a voltage at which an optimal image may be displayed at the first reference point 11A when a certain voltage is applied to the counter electrode. The first setting value is, for example, a value of a voltage that is applied to the counter electrode, and also, is a value of the voltage at which variation in luminance at the first reference point 11A is the smallest. The first setting value may be obtained by a known method, for example, may be, a measured value based on a real machine, or may be a calculated value obtained by a computer simulation.

When a voltage of the first setting value is applied to the counter electrode, a luminance variation portion 12A appears at each of both the end portions of the liquid crystal panel 10. The luminance variation portion 12A is a portion in which, when a voltage of the first setting value is applied to the counter electrode, variation in luminance is a predetermined value or more, or a portion in which there is a probability thereof. The predetermined value may be determined as appropriate in accordance with display quality of a liquid crystal, which is desired for the liquid crystal panel 10. The predetermined value may also be determined by a known method, for example, may be a measured value based on a real machine, or may be a calculated value obtained by a computer simulation. The luminance variation portion 12A that is caused to appear by application of a voltage of the first setting value appears at each of the both end portions of liquid crystal panel 10. More specifically, the luminance variation portion 12A is distributed along each of both ends of the liquid crystal panel 10 from a center portion of each of the both end portions of the liquid crystal panel 10 toward a corresponding one of both side portions.

Figure 2C:
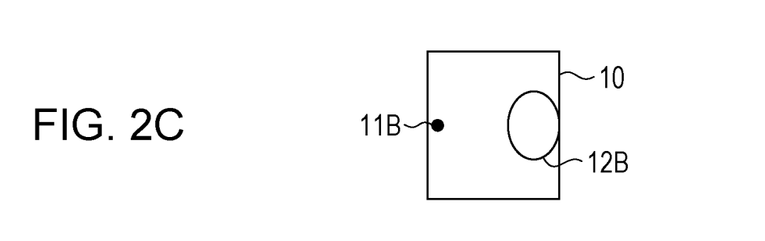
FIG. 2C is a view schematically illustrating a location of occurrence of variation in luminance when a voltage of a second setting value is applied to the counter electrode.

FIG. 2C is a view schematically illustrating a location of occurrence of variation in luminance when a voltage of the second setting value is applied to the counter electrode. Similar to the first setting value, the second setting value is a value of a voltage at which an optimal image may be displayed at the second reference point 11B when a certain voltage is applied to the counter electrode and may be obtained by a similar method to the method used for obtaining the first setting value. A luminance variation portion 12B that is caused to appear by application of a voltage of the second setting value is distributed in the other end portion of the liquid crystal panel 10, that is, more specifically, a center portion of the other end side of the liquid crystal panel 10.

Figure 2D:
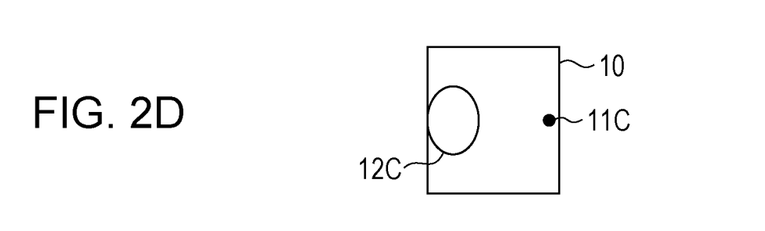
FIG. 2D is a view schematically illustrating a location of occurrence of variation in luminance when a voltage of a third setting value is applied to the counter electrode.

FIG. 2D is a view schematically illustrating a location of occurrence of variation in luminance when a voltage of the third setting value is applied to the counter electrode. Similar to the first setting value, the third setting value is a value of a voltage at which an optimal image may be displayed at the third reference point 11C when a certain voltage is applied to the counter electrode and may be obtained by a similar method to the method used for obtaining the first setting value. A luminance variation portion 12C that is caused to appear by application of a voltage of the third setting value is distributed in one end portion of the liquid crystal panel 10, that is, more specifically, a center portion of one end side of the liquid crystal panel 10.

Figure 2E:
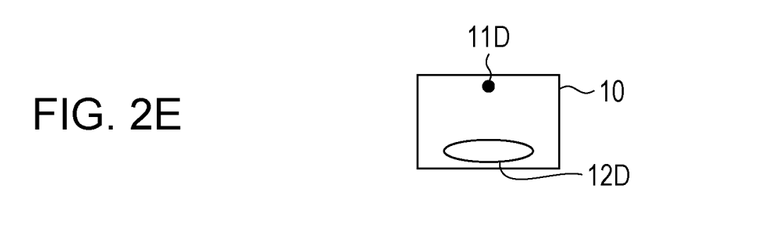
FIG. 2E is a view schematically illustrating a location of occurrence of variation in luminance when a voltage of a fourth setting value is applied to the counter electrode.

FIG. 2E is a view schematically illustrating a location of occurrence of variation in luminance when a voltage of the fourth setting value is applied to the counter electrode. Similar to the first setting value, the fourth setting value is a value of a voltage at which an optimal image may be displayed at the fourth reference point 11D when a certain voltage is applied to the counter electrode and may be obtained by a similar method to the method used for obtaining the first setting value. A luminance variation portion 12D that is caused to appear by application of a voltage of the fourth setting value is distributed in the other side portion of the liquid crystal panel 10, that is, more specifically, along the other side end from a center portion of the other side portion of the liquid crystal panel 10 toward the both end portions.

Figure 2F:
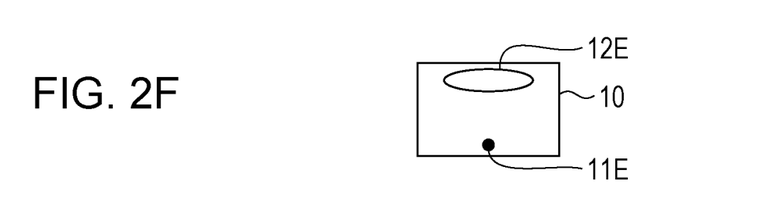
FIG. 2F is a view schematically illustrating a location of occurrence of variation in luminance when a voltage of a fifth setting value is applied to the counter electrode.

FIG. 2F is a view schematically illustrating a location of occurrence of variation in luminance when a voltage of a fifth setting value is applied to the counter electrode. Similar to the first setting value, the fifth setting value is a value of a voltage at which an optimal image may be displayed at the fifth reference point 11E when a certain voltage is applied to the counter electrode and may be obtained by a similar method to the method used for obtaining the first setting value. A luminance variation portion 12E that is caused to appear by application of a voltage of the fifth setting value is distributed in one side portion of the liquid crystal panel 10, that is, more specifically, along one side end from a center portion of the one side portion of the liquid crystal panel 10 toward the both end portions.

Figure 3A:
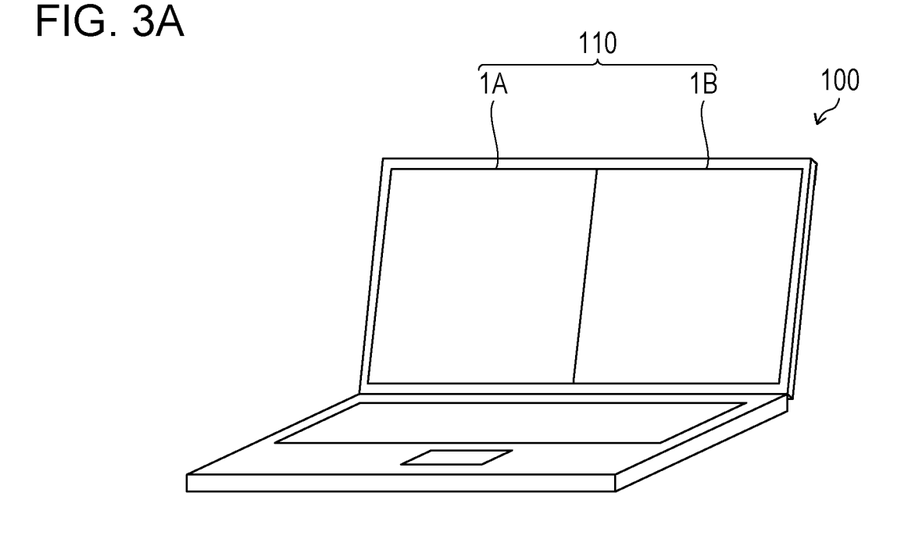
FIG. 3A is a view schematically illustrating a structure of an electronic device according to Embodiment 1 of the present disclosure and FIG. 3B is a block diagram schematically illustrating a relationship between blocks in the electronic device.
Figure 3B:
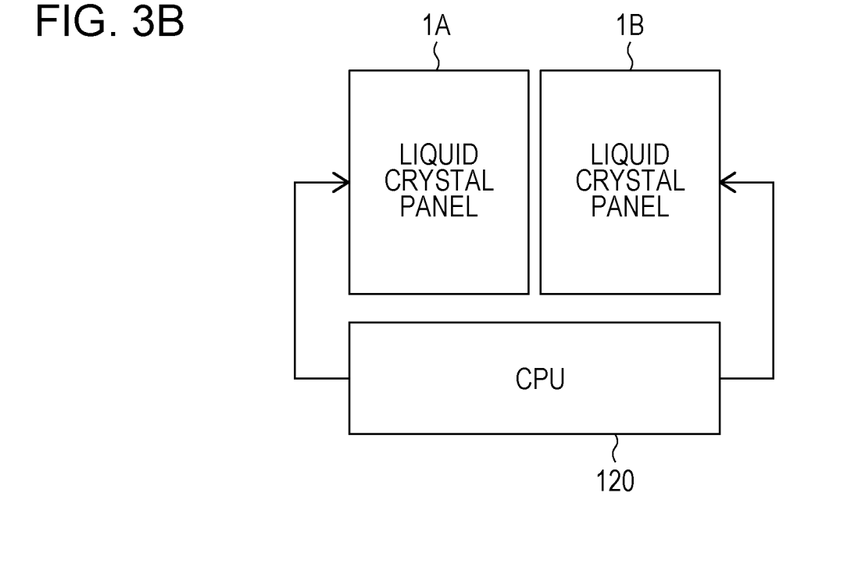

FIG. 3A is a view schematically illustrating a structure of an electronic device according to Embodiment 1 and FIG. 3B is a block diagram schematically illustrating a relationship between blocks in the electronic device.

An electronic device 100 includes a display screen 110 and a central processing unit (CPU) 120, as illustrated in FIG. 3A and FIG. 3B. The electronic device 100 is, for example, a notebook type personal computer (PC). The display screen 110 is formed of two liquid crystal display devices 1A and 1B arranged in parallel. Each of the liquid crystal display devices 1A and 1B is the same as the liquid crystal display device 1 described above and includes the first to fifth setting values described above.

When an image is displayed, the CPU 120 inputs a signal (which is hereinafter referred to as an "image input signal") related to display of the image to each of the liquid crystal display devices 1A and 1B. The image input signal includes, for example, a signal that indicates a position of a liquid crystal panel in the screen that is to be formed by the liquid crystal panel. Also, the image input signal includes, for example, as well as a signal of an image, a signal that designates a liquid crystal display device that is to display the image.

Figure 4A:
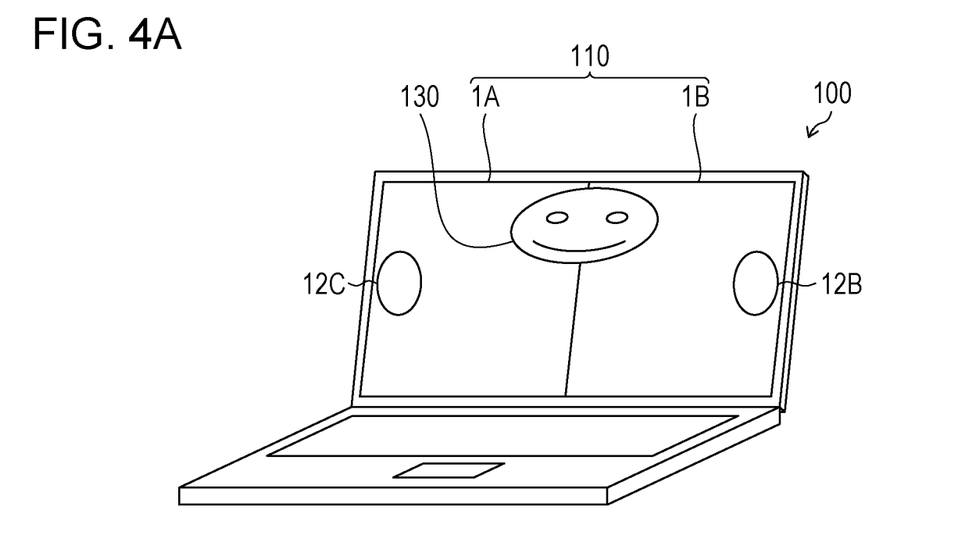
FIG. 4A is a view schematically illustrating a first display example of an image in an electronic device according to Embodiment 1 of the present disclosure and FIG. 4B is a view schematically illustrating a second display example of an image in the electronic device.
Figure 4B:
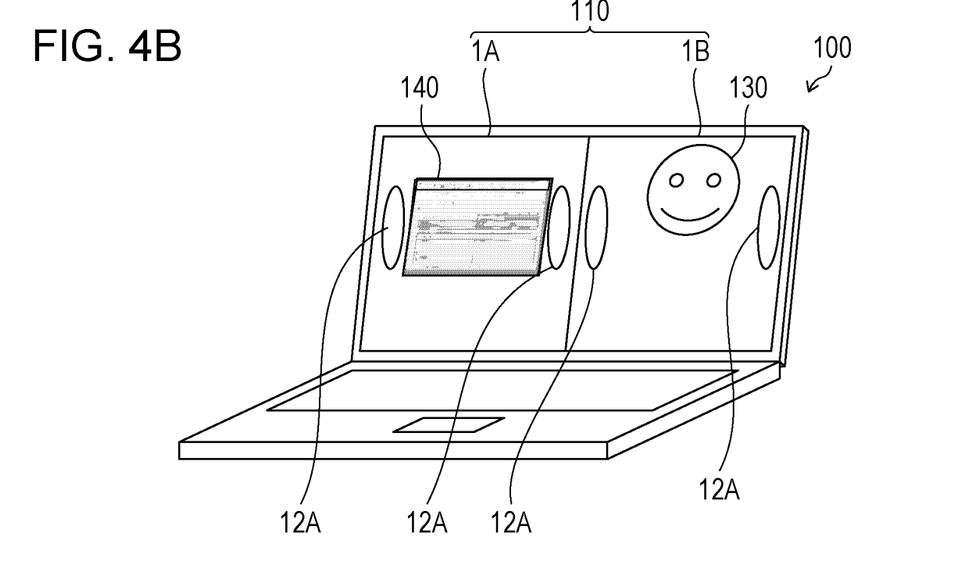

A display format of an image in the electronic device 100 is described below. FIG. 4A is a view schematically illustrating a first display example of an image in the electronic device 100 and FIG. 4B is a view schematically illustrating a second display example of an image in the electronic device 100.

As illustrated in FIG. 4A, in a case in which the liquid crystal display devices 1A and 1B are used as one screen to display an image, the CPU 120 transmits the image as the image input signal to each of the liquid crystal display devices 1A and 1B. The image input signal includes a signal that indicates a position on the display screen 110 of the liquid crystal display devices 1A and 1B and a signal indicating that both the liquid crystal display devices 1A and 1B are used as one screen to display an image 130. The image 130 is, for example, a picture image.

The control unit 20 of each of the liquid crystal display devices 1A and 1B receives the image input signal and determines an optimal setting value from the above-described first to fifth setting values. For example, the control unit 20 determines a reference point that is located sufficiently close to a center of one or more images that are to be displayed on the display screen 110 among the first to fifth reference points 11A to 11E. Then, the control unit 20 determines a setting value that corresponds to the determined reference point as the setting value of each of the liquid crystal display devices 1A and 1B.

In the liquid crystal display device 1A, the control unit 20 selects the third reference point 11C that is sufficiently close to a center of the image 130, applies a voltage of the third setting value to the counter electrode of the liquid crystal panel 10, and displays a half (a left half with respect to a paper surface) of the image 130 on the liquid crystal panel 10. In the liquid crystal display device 1B, the control unit 20 selects the second reference point 11B that is sufficiently close to a center of the image 130, applies a voltage of the second setting value to the counter electrode of the liquid crystal panel 10, and displays a half (a right half with respect to the paper surface) of the image 130 on the liquid crystal panel 10.

As illustrated in FIG. 4A, the image 130 is formed in a center portion of the display screen 110. The luminance variation portion 12C in the liquid crystal display device 1A is located in one end portion of the display screen 110 and the luminance variation portion 12B in the liquid crystal display device 1B is located in the other end portion of the display screen 110.

Note that the luminance variation portions 12B and 12C are normally substantially the same as the luminance variation portions 12B and 12C when the second and third setting values were determined and may not be the same. For example, one or more selected from a group including magnitude, shape, and luminance of each of the luminance variation portions 12B and 12C when an image is actually displayed may be the same as or different from the one or more when a corresponding setting value was determined.

As described above, on the display screen 110, the luminance variation portions 12B and 12C are located at positions located sufficiently apart from the image 130. Therefore, in display of the image 130 on the center portion of the display screen 110, a display defect of variation in luminance due to application of a voltage to the counter electrode is not practically a problem.

As illustrated in FIG. 4B, in a case in which two independent images are displayed on the liquid crystal display devices 1A and 1B, respectively, the CPU 120 transmits the images as the image input signals. The image input signal includes a signal that indicates a position on the display screen 110 of each of the liquid crystal display devices 1A and 1B, a signal indicating that the image 130 is displayed in the liquid crystal display device 1B, and a signal indicating that an image 140 is displayed in the liquid crystal display device 1A. The image 140 is, for example, a table image.

In the liquid crystal display device 1B, the control unit 20 selects the first reference point 11A sufficiently close to the center of the image 130, applies a voltage of the first setting value to the counter electrode of the liquid crystal panel 10, and displays the image 130 on the liquid crystal panel 10 thereof. In the liquid crystal display device 1A, the control unit 20 selects the first reference point 11A sufficiently close to a center of the image 140, applies a voltage of the first setting value to the counter electrode of the liquid crystal panel 10, and displays the image 140 on the liquid crystal panel 10 thereof.

As illustrated in FIG. 4B, the image 130 is displayed in the liquid crystal display device 1B and the image 140 is displayed in the liquid crystal display device 1A. Also, in each of the liquid crystal panels 10 of the liquid crystal display devices 1A and 1B, the luminance variation portion 12A is located in each of both end portions of each of the liquid crystal panels 10 of the liquid crystal display devices 1A and 1B. The luminance variation portion 12A is substantially the same as that when the first setting value was determined.

As described above, also in a case in which an image is independently displayed on each of the liquid crystal panels of the two liquid crystal display devices 1A and 1B, the luminance variation portion 12A is located in a position located sufficiently apart from each of the image 130 and the image 140 on the display screen 110. Therefore, also in display of two images on the display screen 110, a display defect of variation in luminance due to application of a voltage to the counter electrode is not practically a problem.

As described above, in the above-described embodiment, a voltage value ($V_{COM}$) that is applied to each counter electrode when optimization is performed in a plurality of locations (five locations) in the liquid crystal panel is stored as a setting value in the liquid crystal display device. Moreover, the liquid crystal display device appropriately uses $V_{COM}$ in accordance with a location on the display screen of the electronic device in which the liquid crystal display device is arranged.

For example, in a case in which two liquid crystal panels are combined to form one display screen, a flicker is adjusted to a center of the display screen. Moreover, for the $V_{COM}$, the third setting value is used in the liquid crystal display device 1A on the left side with respect to a paper surface and the second setting value is used in the liquid crystal display device 1B on the right side with respect to the paper surface. The above-described variation in luminance is located in each of both end portions of the displayed image, and therefore, is not practically a problem.

Also, for example, in a case in which each of the two liquid crystal panels is used as one independent screen (the entire display screen includes two screens), each of the liquid crystal display devices 1A and 1B adjusts the flicker to a center of the corresponding one of the display screens. Moreover, for the $V_{COM}$, the first setting value is used for each of the liquid crystal display devices 1A and 1B. The variation in luminance is located in each of both end portions of each of the displayed images, and therefore, is not practically a problem.

Selection of whether the flicker is adjusted to the center of the screen formed of the two panels of the two liquid crystal display devices or to the center of each of the liquid crystal panels may be automatically switched in accordance with a content (an image) that is to be displayed, and alternatively, may be switched by a command.

Embodiment 2

Figure 5A:
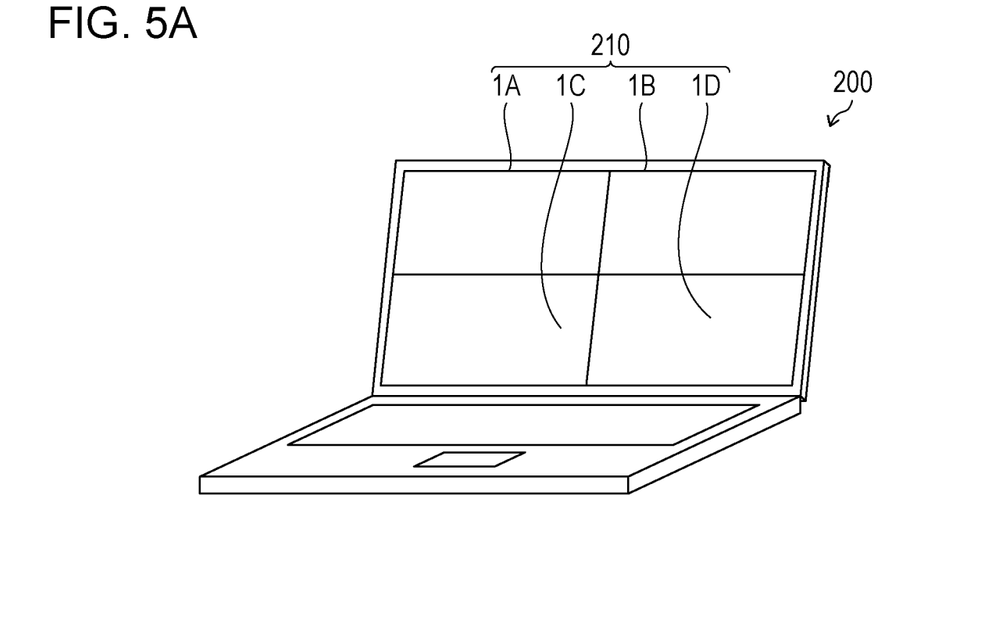
FIG. 5A is a view schematically illustrating a structure of an electronic device according to Embodiment 2 of the present disclosure and FIG. 5B is a block diagram schematically illustrating a relationship between blocks in the electronic device.

Another embodiment of the present disclosure is described below. Note that, for convenience of description, a member that has the same function as that of a member described in the above-described embodiment is denoted by the same reference character as that of the member described in the above-described embodiment, and the description thereof is not repeated. FIG. 5A is a view schematically illustrating a structure of an electronic device according to Embodiment 2 and FIG. 5B is a block diagram schematically illustrating a relationship between blocks in the electronic device.

Figure 5B:
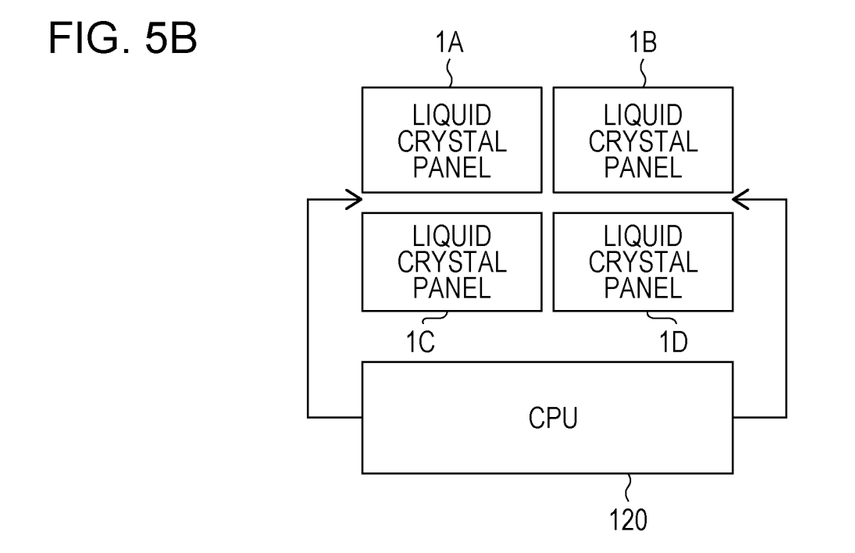

An electronic device 200 includes a display screen 210 and a CPU 120, as illustrated in FIG. 5A and FIG. 5B. The electronic device 200 is, for example, a notebook type PC. The display screen 210 is formed of four liquid crystal display devices 1A, 1B, 1C, and 1D arranged such that two liquid crystal display devices are arrayed longitudinally and laterally. Each of the liquid crystal display devices 1A, 1B, 1C, and 1D is the same as the liquid crystal display device 1 described above and has the first to fifth setting values described above. When an image is displayed, the CPU 120 inputs the image input signal described above to each of the liquid crystal display devices 1A, 1B, 1C, and 1D.

Figure 6A:
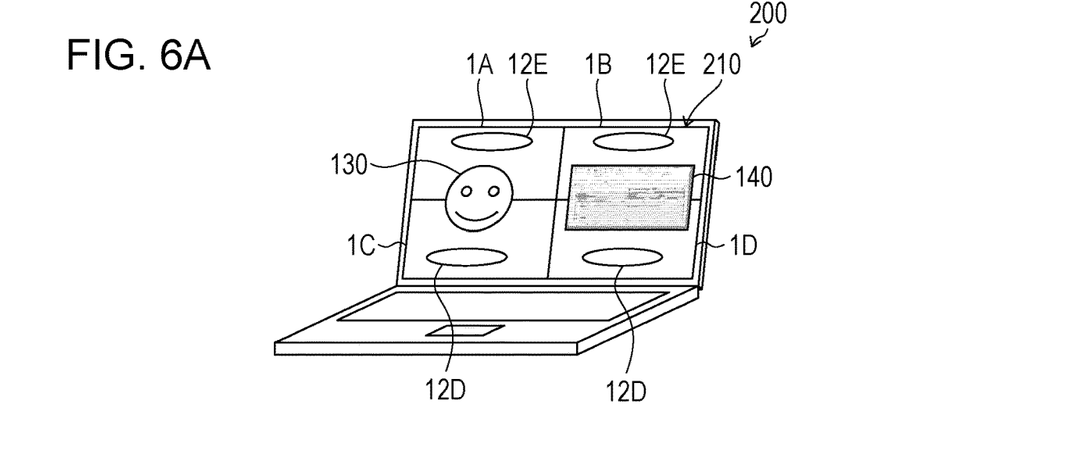
FIG. 6A is a view schematically illustrating a first display example of an image in an electronic device according to Embodiment 2 of the present disclosure.
Figure 6B:
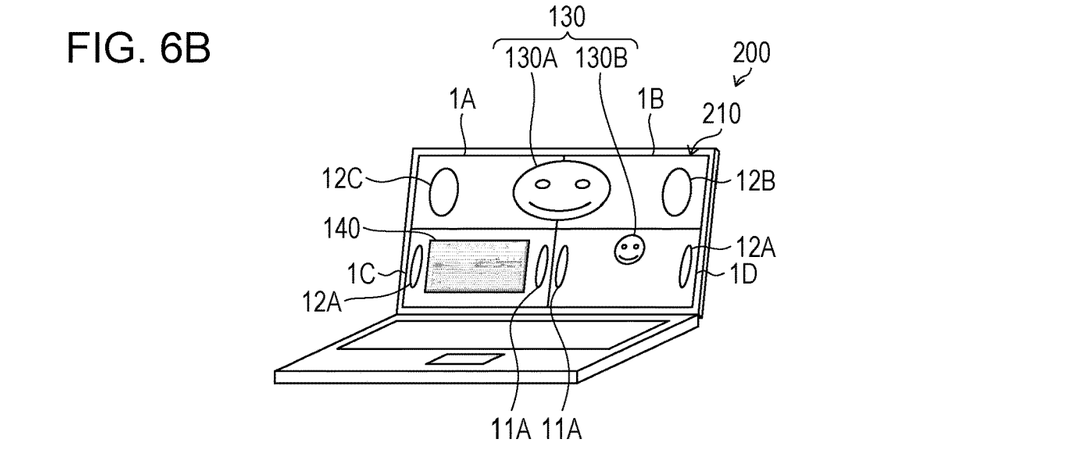
FIG. 6B is a view schematically illustrating a second display example of an image in the electronic device.
Figure 6C:
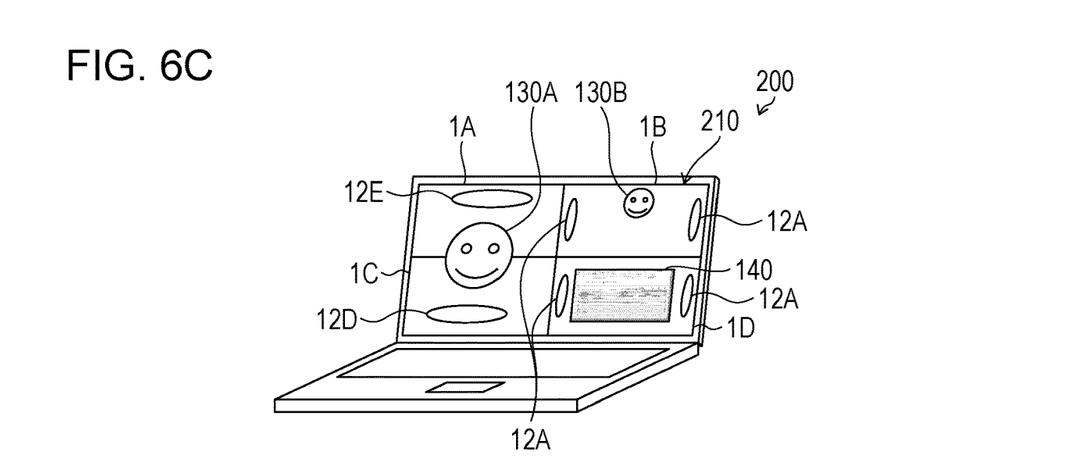
FIG. 6C is a view schematically illustrating a third example of an image in the electronic device.

A display format of an image in the electronic device 200 is described below. FIG. 6A is a view schematically illustrating a first display example of an image in the electronic device 200, FIG. 6B is a view schematically illustrating a second display example of an image in the electronic device 200, and FIG. 6C is a view schematically illustrating a third display example of an image in the electronic device 200.

In the first display example, the CPU 120 transmits a signal that indicates a position on the display screen 210 and a signal of a corresponding one of the image 130 and the image 140 that are to be displayed as the image input signals to each of the liquid crystal display devices 1A, 1B, 1C, and 1D. The control unit 20 of each of the liquid crystal display devices 1A, 1B, 1C, and 1D receives the image input signals and then determines an optimal setting value from the first to fifth setting values.

For example, the control unit 20 of the liquid crystal display device 1A and the control unit 20 of the liquid crystal display device 1B receive the image display signals, select the fifth reference point 11E, and determine the fifth setting value as $V_{COM}$. Also, the control unit 20 of the liquid crystal display device 1C and the control unit 20 of the liquid crystal display device 1D receive the image display signals, select the fourth reference point 11D, and determine the fourth setting value as $V_{COM}$.

As illustrated in FIG. 6A, an image 130 is formed across a liquid crystal panel of the crystal display device 1A and a liquid crystal panel of the crystal display device 1C on a left half of the display screen 210. An image 140 is formed across a liquid crystal panel of the crystal display device 1B and a liquid crystal panel of the crystal display device 1D on a right half of the display screen 210.

The luminance variation portion 12E in each of the liquid crystal panels of the liquid crystal display device 1A and the liquid crystal display device 1B is located in one side portion (an upper side) of the display screen 210. The luminance variation portion 12D in each of the liquid crystal panels of the liquid crystal display device 1C and the liquid crystal display device 1D is located in the other side portion (a lower side) of the display screen 210. The luminance variation portions 12D and 12E are substantially the same as those when the fourth and fifth setting values were determined.

As described above, in the first display example, on the display screen 210, the luminance variation portions 12D and 12E are located in positions located sufficiently apart from each of an image 130 and an image 140. Therefore, when the image 130 and the image 140 are displayed on the display screen 210, a display defect of variation in luminance due to application of a voltage to the counter electrode is not practically a problem.

In the second display example, the CPU 120 transmits a signal that indicates a position on the display screen 210 and a signal of a corresponding one of images 130 (130A and 130B) and the image 140 that are to be displayed as the image input signals to the liquid crystal display devices 1A, 1B, 1C, and 1D. The control unit 20 of each of the liquid crystal display devices 1A, 1B, 1C, and 1D receives the image input signals and determines an optimal setting value from the first to fifth setting values.

For example, the control unit 20 of the liquid crystal display device 1A receives the image display signals, selects the third reference point 11C, and determines the third setting value as $V_{COM}$. Also, the control unit 20 of the liquid crystal display device 1B receives the image display signals, selects the second reference point 11B, and determines the second setting value as $V_{COM}$. Also, each of the control unit 20 of the liquid crystal display device 1C and the control unit 20 of the liquid crystal display device 1D receives the image display signals, selects the first reference point 11A, and determines the first setting value as $V_{COM}$.

As illustrated in FIG. 6B, an image 130A is formed across both the liquid crystal panels of the liquid crystal display device 1A and the liquid crystal display device 1B in an upper half of the display screen 210. Also, the liquid crystal display device 1C displays an image 140 and the liquid crystal display device 1D displays another image 130B.

In the upper half of the display screen 210, the luminance variation portions 12B and 12C are located at both end portions. Also, in a lower half of the display screen 210, in the liquid crystal display devices 1C and 1D, for each of the image 140 and the image 130B displayed in center portions thereof, the luminance variation portion 12A is located in each of the both end portions. The luminance variation portions 12A, 12B, and 12C are substantially the same as those when the above-described first, second, and third setting values were determined.

As described above, in the second display example, on the display screen 210, each of the luminance variation portions 12A, 12B, and 12C is located at a position located sufficiently apart from each of the image 130A, the image 130B, and the image 140. Therefore, when the image 130A, image 130B, and image 140 are displayed on the display screen 210, a display defect of variation in luminance due to application of a voltage to the counter electrode is not practically a problem.

In the third display example, the CPU 120 transmits a signal that indicates a position on the display screen 210 and a signal of a corresponding one of the image 130A, the image 130B, and the image 140 that are to be displayed as the image input signals to the liquid crystal display devices 1A, 1B, 1C, and 1D. The control unit 20 of each of the liquid crystal display devices 1A, 1B, 1C, and 1D receives the image input signals and determines an optimal setting value from the first to fifth setting values.

For example, the control unit 20 of the liquid crystal display device 1A receives the image display signals, selects the fifth reference point 11E, and determines the fifth setting value as $V_{COM}$. Also, the control unit 20 of the liquid crystal display device 1B and the control unit 20 of the liquid crystal display device 1D receive the image display signals, select the first reference point 11A, and determine the first setting value as $V_{COM}$. Furthermore, the control unit 20 of the liquid crystal display device 1C receives the image display signals, selects the fourth reference point 11D, and determines the fourth setting value as $V_{COM}$.

As illustrated in FIG. 6C, the image 130A is formed across both the liquid crystal panels of the liquid crystal display device 1A and the liquid crystal display device 1C in a left half of the display screen 210. Also, the liquid crystal display device 1B displays the other image 130B and the liquid crystal display device 1D displays the image 140.

In the left half of the display screen 210, the luminance variation portions 12E and 12D are located in both side (upper and lower end) portions. Also, in the right half of the display screen 210, in the liquid crystal display devices 1B and 1D, for each of the image 130B and the image 140 displayed in center portions thereof, the luminance variation portion 12A is located in each of the end portions thereof. The luminance variation portions 12A, 12D, and 12E are substantially the same as those when the first, fourth and fifth setting values were determined.

As described above, also in the above-described third display example, on the display screen 210, the luminance variation portions 12A, 12D, and 12E are located in positions located sufficiently apart from each of the image 130A, the image 130B, and the image 140. Therefore, when the image 130A, image 130B, and image 140 are displayed on the display screen 210, a display defect of variation in luminance due to application of a voltage to the counter electrode is not practically a problem.

As described above, also in this embodiment, each $V_{COM}$ when optimization was performed in a plurality of locations (five locations) in the liquid crystal panels is stored as a setting value in the liquid crystal display devices. Moreover, the liquid crystal display devices appropriately use $V_{COM}$ in accordance with locations on the display screen of the electronic device in which the liquid crystal display devices are arranged.

A display screen formed of four liquid crystal panels may be used as a plurality of independent screens. Also, in such various modes of use, a display defect (variation in luminance) due to application of a voltage to the counter electrode is located sufficiently apart from an image that is to be displayed, and therefore, is not practically a problem.

In this embodiment, to where a center of a display screen formed of four liquid crystal display devices is adjusted may be automatically switched in accordance with an image that is to be displayed, and alternatively, may be switched by a command.

Embodiments 3

Figure 7A:
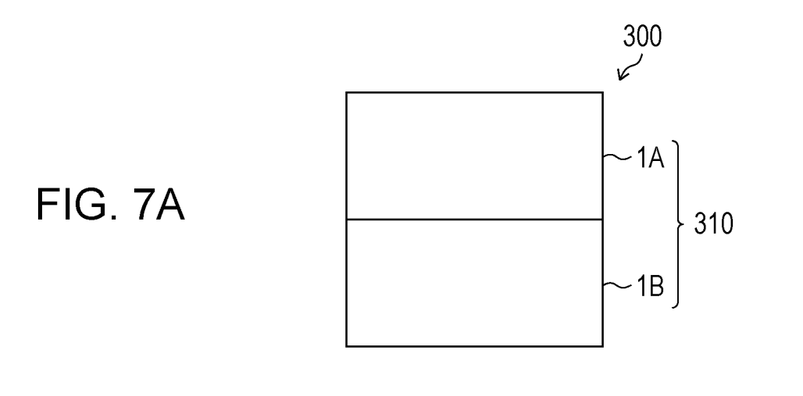
FIG. 7A is a view schematically illustrating a structure of an electronic device according to Embodiments 3 of the present disclosure.
Figure 7B:
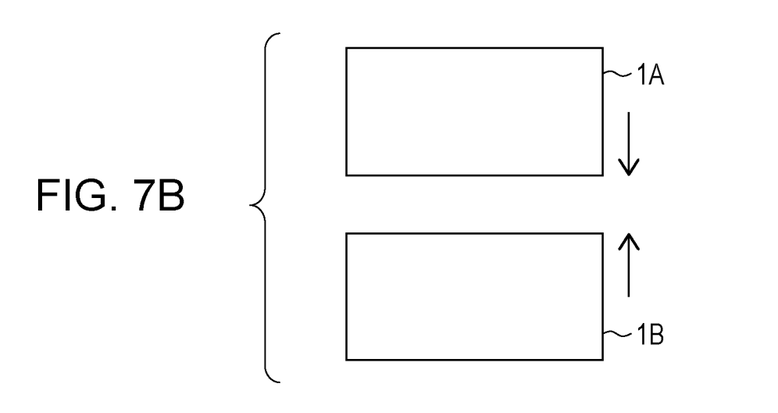
FIG. 7B is a view schematically illustrating a first structural example of the electronic device.
Figure 7C:
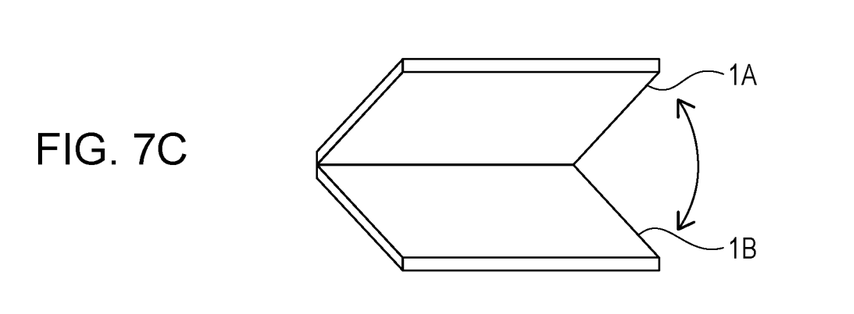
FIG. 7C is a view schematically illustrating a second structural example of the electronic device.

Another embodiment of the present disclosure is described below. Note that, for convenience of description, a member that has the same function as that of a member described in the above-described embodiments is denoted by the same reference character as that of the member described in the above-described embodiments, and the description thereof is not repeated. FIG. 7A is a view schematically illustrating a structure of an electronic device according to Embodiments 3 of the present disclosure, FIG. 7B is a view schematically illustrating a first structural example of the electronic device, and FIG. 7C is a view schematically illustrating a second structural example of the electronic device.

An electronic device 300 includes a display screen 310 and a CPU (not illustrated), as illustrated in FIG. 7A. The display screen 310 is formed of two liquid crystal display devices 1, that is, a liquid crystal display device 1A and a liquid crystal display device 1B. The display screen 310 is formed of a combination of the liquid crystal display device 1A and the liquid crystal display device 1B that are detachable and attachable as desired with each other, for example, as illustrated in FIG. 7B. Alternatively, the display screen 310 is formed by rotation of the liquid crystal display device 1A and the liquid crystal display device 1B that are rotatably connected as desired to one another via a hinge (not illustrated), as illustrated in FIG. 7C. Also, one or both of the liquid crystal display device 1A and the liquid crystal display device 1B further have a touch screen function.

The CPU is, for example, included in a control unit 20 of each of the liquid crystal display devices 1A and 1B. Similarly to the CPU 120, the above-described CPU may be independently included in the control unit 20, or the above-described CPU may be configured to have a configuration that shares some or all of the other structures in the control unit 20.

Figure 8A:
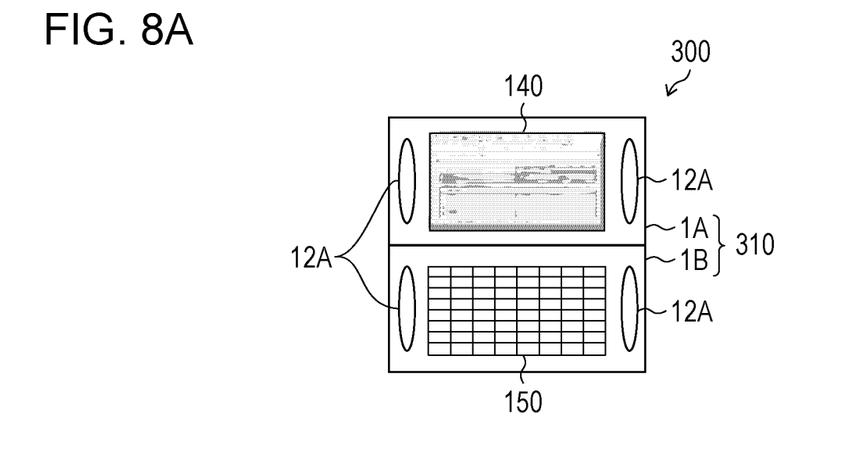
FIG. 8A is a view schematically illustrating a first display example of an image in an electronic device according to Embodiments 3 of the present disclosure and FIG. 8B is a view schematically illustrating a second display example of an image in the electronic device.
Figure 8B:
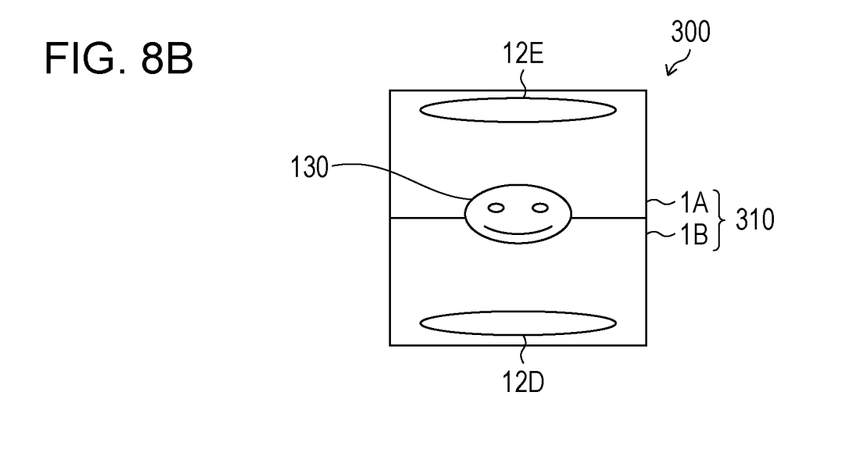

The electronic device 300 is started up, for example, by a combination or rotation of the liquid crystal display device 1A and the liquid crystal display device 1B. A display format of an image by the electronic device 300 is described below. FIG. 8A is a view schematically illustrating a first display example of an image in the electronic device 300 and FIG. 8B is a view schematically illustrating a second display example of an image in the electronic device 300.

For example, when the CPU is started up, the CPU transmits a signal that indicates a position on the display screen 310 and a signal of a corresponding one of an image 140 and an image 150 that are to be displayed as the image input signals to the liquid crystal display devices 1A and 1B. Each of the control units 20 of the liquid crystal display devices 1A and t 1B receives the image input signals and determines an optimal setting value from the first to fifth setting values. Note that the image 150 is an image for operation and is, for example, an image of a plurality of arrayed keys.

Each of the control units 20 of the liquid crystal display device 1A and the control unit 20 of the liquid crystal display device 1B receives the image display signals, selects the first reference point 11A, and determines the first setting value as $V_{COM}$. Luminance variation portions 12A in each of liquid crystal panels of the liquid crystal display device 1A and the liquid crystal display device 1B are located in both end portions of the corresponding one of the liquid crystal display devices on the display screen 310, as illustrated in FIG. 8A. The luminance variation portions 12A are substantially the same as those when the first setting value was determined. Therefore, when the image 140 and the image 150 are displayed on the display screen 310, a display defect of variation in luminance due to application of a voltage to the counter electrode is not practically a problem.

Note that, in this embodiment, a user may input a command using a key of the image 150 and a result of the input may be displayed as the image 140. That is, in the first example, the electronic device 300 functions as a notebook type PC.

Also, in a case in which one image 130 is displayed on the display screen 310, the CPU transmits a signal that indicates a position on the display screen 310 and a signal of the image 130 that is to be displayed as the image input signals to each of the control units 20 of the liquid crystal display devices 1A and 1B. When the control units 20 receive the image display signals, the control unit 20 of the liquid crystal display device 1A selects the fifth reference point 11E and determines the fifth setting value as $V_{COM}$ and the control unit 20 of the liquid crystal display device 1B selects the fourth reference point 11D and determines the fourth setting value as $V_{COM}$.

Luminance variation portion 12D and 12E in both of liquid crystal panels of the liquid crystal display device 1A and the liquid crystal display device 1B are located at both side portions (upper and lower sides) of the display screen 310, as illustrated in FIG. 8B. The luminance variation portions 12D and 12E are substantially the same as those when the fourth and fifth setting values were determined. Therefore, when the image 130 is displayed on the display screen 310, a display defect of variation in luminance due to application of a voltage to the counter electrode is not practically a problem.

In any one of the electronic devices of the above-described embodiments, the liquid crystal display device 1 is a module that forms a display screen. For example, each of the electronic devices 100 and 200 of the Embodiments 1 and 2 may be configured as a PC set of a two-screen display or a four-screen display by shipping the liquid crystal display device 1 as the module and then incorporating the liquid crystal display device 1 in a PC case in a shipment destination. Also, the electronic device 300 of Embodiment 3 may be configured by shipping two liquid crystal display devices 1 as the module and then connecting the two liquid crystal display devices 1 to one another to be detachable and attachable or rotatably as desired in a shipment destination.

Modified Example

An embodiment of the present disclosure may include a further embodiment in a range in which an advantage of each of the embodiments described above may be achieved.

For example, although, in the above-described embodiments, the five setting values based on the five reference points are used, the positions of the reference points may be some other positions and the setting values may be some other values based on the other reference points. For example, the above-described reference points may include four corners of a liquid crystal panel of a liquid crystal display device and the above-described setting values may include values based on reference points of the four corners.

Also, the above-described image input signals may include a command that causes the setting value to be selected. The image input signals may be output from the CPU in accordance with an instruction of a user of an electronic device. Thus, it is possible to appropriately change a position of a luminance variation portion on a display screen. Therefore, in view of visibility of the user, the position of the luminance variation portion may be determined in some other position than a position of an image on the display screen, and convenience of the user is increased.

Also, in the above-described embodiments, $V_{COM}$ is determined based on a distance between a center portion of an image that is to be displayed and the reference point, but may be determined by some other method or the method described in the embodiments in combination with some other method. Examples of other methods include a method in which $V_{COM}$ is determined such that a ratio of an area that represents a luminance variation portion to an area of the whole image to be displayed is reduced. Using some other method described above or the method described in the above-described embodiments in combination with some other method, another setting value may be selected in a range in which the luminance variation portion does not substantially influence an image. For example, in the liquid crystal display device 1B illustrated in FIG. 4B, in a range of displaying an image in which there is no practical problem, instead of the first reference point 11A, the fourth reference point 11D may be selected. As a result, instead of a luminance variation portion 12A, a luminance variation portion 12D located in the other side (the lower side with respect to a paper surface) in the liquid crystal panel may be selected.

Also, although the above-described counter electrode is a common electrode, the counter electrode may be in some other format. For example, as in an in-plane switching (IPS) type liquid crystal panel, the counter electrode may be formed for each pixel so as to correspond to each individual pixel electrode. A voltage of a predetermined setting value may be applied to the counter electrode.

Also, although the control unit of the liquid crystal display device further includes a calculation unit that selects one of the above-described setting values, based on the above-described image input signal, the electronic device may include the calculation unit. In this case, the image input signals may further include a signal that corresponds to a signal that indicates the setting value, and alternatively, the CPU may be configured to transmit a signal indicating that the setting value has been calculated by the calculation unit as the image input signal to the control unit.

Also, although, in each of the above-described embodiments, the image input signal includes a signal that indicates a position of the liquid crystal panel (a liquid crystal display device) on the display screen, the image input signal may not include the signal. In this case, the signal may be transmitted as the image input signal with a signal of an image from the CPU. Alternatively, in that case, in the control unit of the liquid crystal display device, the position of the liquid crystal display device on the display screen may be input in advance as information unique to the liquid crystal display device.

CONCLUSION

A liquid crystal display device according to an embodiment of the present disclosure includes a liquid crystal panel that includes a pixel electrode and a counter electrode, a storage unit that stores a plurality of setting values of a voltage applied to the counter electrode, and a drive unit that applies a voltage of the setting value selected from the plurality of setting values to the counter electrode. The setting value is a value of the applied voltage at which variation in luminance in the liquid crystal panel due to application of a voltage to the counter electrode, when a region of the liquid crystal panel is used as a reference, appears at an end portion or a side portion located apart from the region in the liquid crystal panel.

With the above-described configuration, even in a case in which a plurality of liquid crystal panels forms a display screen, it is possible to substantially restrain a display defect due to a potential difference.

Also, the setting values may include a first setting value at which the variation in luminance when a center portion of the liquid crystal panel is a reference appears at each of both (first and second) end portions of the liquid crystal panel, a second setting value at which the variation in luminance when a center portion of one (first) end portion of the liquid crystal panel is a reference appears at the other (second) end portion of the liquid crystal panel, a third setting value at which the variation in luminance when a center portion of the other end portion of the liquid crystal panel is a reference appears at the one end portion of the liquid crystal panel, a fourth setting value at which the variation in luminance when a center portion of one (first) side portion of the liquid crystal panel is a reference appears at the other (second) side portion of the liquid crystal panel, and a fifth setting value at which the variation in luminance when a center portion of the other side portion of the liquid crystal panel is a reference appears at the one side portion of the liquid crystal panel.

In view of causing the luminance variation portion to be located in a position located sufficiently apart from an image that is to be displayed on a screen formed by combination of various liquid crystal panels, the above-described configuration is further more effective.

Also, in view of configuring a counter electrode such that a uniform voltage is applied to every pixel in a liquid crystal panel in a simple manner, it is further more effective that the counter electrode is a common electrode.

Also, the liquid crystal display device may further include a calculation unit that selects one of the setting values, based on the signal that is input. In view of facilitating assembly of an electronic device in which a plurality of liquid crystal panels forms a display screen and in view of simplifying the other structures than the liquid crystal display device in a configuration of the electronic device, this configuration is further more effective.

Also, in view of increasing accuracy when the setting value is selected in each liquid crystal panel, it is further more effective that the signal that is input includes a signal indicating a position of the liquid crystal panel on a screen that is to be formed by the liquid crystal panel. For example, it is expected that effectiveness is sufficiently expressed also on a display screen, such as a display screen of a tablet, an aspect ratio of which varies.

Also, in view of increasing convenience of a user of an electronic device including a liquid crystal display device, it is further more effective that the signal that is input includes a command that causes the setting value to be selected.

Also, an electronic device according to the embodiment includes the above-described liquid crystal display device and a central processing device that transmits the signal that is input to the liquid crystal display device. With the above-described configuration, also in a case in which a plurality of liquid crystal panels forms a display screen, a display defect due to a potential difference may be sufficiently restrained.

The present disclosure is not limited to each of the above-described embodiments, various modifications and changes may be made to those embodiments within the scope set forth in the claims, and an embodiment achieved by combining, as appropriate, technical aspects disclosed in different embodiments is also included in a technical range of the present disclosure. Furthermore, a new technical feature may be formed by combining the technical aspects disclosed in the above-described embodiments.

The present disclosure contains subject matter related to that disclosed in Japanese Priority Patent Application JP 2017-197581 filed in the Japan Patent Office on Oct. 11, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
   a liquid crystal panel that includes a pixel electrode and a counter electrode;
   a storage unit that stores a plurality of setting values of a voltage applied to the counter electrode; and
   a drive unit that applies a voltage of the setting value selected from the plurality of setting values to the counter electrode,
   wherein the setting value is a value of the applied voltage at which variation in luminance in the liquid crystal panel due to application of the voltage to the counter electrode, when a region of the liquid crystal panel is a reference, appears at an end portion or a side portion located apart from the region in the liquid crystal panel.

2. The liquid crystal display device according to claim 1, wherein the plurality of setting values include
   a first setting value at which the variation in luminance when a center portion of the liquid crystal panel is a reference appears at each of first and second end portions of the liquid crystal panel,
   a second setting value at which the variation in luminance when a center portion of the first end portion of the liquid crystal panel is a reference appears at the second end portion of the liquid crystal panel,
   a third setting value at which the variation in luminance when a center portion of the second end portion of the liquid crystal panel is a reference appears at the first end portion of the liquid crystal panel,
   a fourth setting value at which the variation in luminance when a center portion of a first side portion of the liquid crystal panel is a reference appears at a second side portion of the liquid crystal panel, and
   a fifth setting value at which the variation in illustration when a center portion of the second side portion of the liquid crystal panel is a reference appears at the first side portion of the liquid crystal panel.

3. The liquid crystal display device according to claim 1, wherein the counter electrode is a common electrode.

4. The liquid crystal display device according to claim 1, further comprising:
   a calculation unit that selects one of the setting values, based on a signal that is input.

5. The liquid crystal display device according to claim 4, wherein the signal that is input includes a signal that indicates a position at the liquid crystal panel in a screen that is formed by the liquid crystal panel.

6. The liquid crystal display device according to claim 4, wherein the signal that is input includes a command that causes the setting value to be selected.

7. An electronic device comprising:
   the liquid crystal display device according to claim 4; and
   a central processing unit that transmits the signal that is input to the liquid crystal display device.

* * * * *